United States Patent
Kimura et al.

[11] Patent Number: 5,259,489
[45] Date of Patent: Nov. 9, 1993

[54] OIL PRESSURE CONTROL FOR AUTOMATIC TRANSMISSIONS

[75] Inventors: Hiromichi Kimura; Kunihiro Iwatsuki, both of Toyota; Takuo Shimizu; Hiroyuki Mori, both of Anjo; Kazunori Ishikawa, Toyota, all of Japan

[73] Assignees: Toyota Jidosha Kabushiki Kaisha, Toyota; Aisin AW Co., Ltd., Anjo, both of Japan

[21] Appl. No.: 888,657

[22] Filed: May 27, 1992

[30] Foreign Application Priority Data

May 27, 1991 [JP] Japan .................. 3-151036

[51] Int. Cl.⁵ ............................. F16D 25/11
[52] U.S. Cl. .................. 192/85 AA; 192/103 F; 192/106 F; 192/3.58
[58] Field of Search ........... 192/3.58, 85 AA, 103 F, 192/106 F

[56] References Cited

U.S. PATENT DOCUMENTS

| | | | |
|---|---|---|---|
| 4,473,143 | 9/1984 | Windsor | 192/3.58 X |
| 4,792,012 | 12/1988 | Morisawa et al. | 192/3.58 X |
| 4,795,011 | 1/1989 | Ushijima et al. | 192/3.58 X |
| 4,805,750 | 2/1989 | Nitz | 192/103 F X |
| 4,875,561 | 10/1989 | Schneider et al. | 192/85 AA X |
| 4,934,218 | 6/1990 | Takase et al. | 192/106 F X |
| 5,062,050 | 10/1991 | Petzold et al. | 192/3.58 X |
| 5,069,319 | 12/1991 | Makabe | 192/3.58 X |

FOREIGN PATENT DOCUMENTS

60-179524 9/1985 Japan .

Primary Examiner—Leslie A. Braun
Assistant Examiner—Andrea Pitts
Attorney, Agent, or Firm—Oblon, Spivak, McClelland, Maier & Neustadt

[57] ABSTRACT

An oil pressure control system for an automatic transmission which is equipped with a clutch including: an oil chamber; a piston adapted to be moved forward by pressure oil fed to the oil chamber; a plurality of friction discs adapted to engage when thrust by the piston; and a check valve assembly adapted to be opened by a centrifugal force, to release the pressure oil from the oil chamber. The control system comprises: an oil passage for feeding and releasing the pressure oil to and from the oil chamber; a limiter for limiting the inflow of the pressure oil into the oil chamber via the oil passage; an idle revolution detector for detecting that the clutch is idly revolving. to output an output signal when it detects the idle revolution; and a command unit made responsive to the output signal of the detector for limiting the inflow of the pressure oil into the clutch via the oil passage.

13 Claims, 5 Drawing Sheets

|      | C1 | C2 | C0 | B1 | B2 | B3 | B0 | F1 | F2 | F0 |
|------|----|----|----|----|----|----|----|----|----|----|
| 1ST  | ○  |    | ○  |    |    | ◎  |    |    | △  | ○  |
| 1.5TH| ○  |    |    |    |    |    | ○  |    | △  |    |
| 2ND  | ○  |    | ○  | ◎  | ○  |    |    | △  |    | ○  |
| 3RD  | ○  | ○  | ○  |    | ○  |    |    |    |    | ○  |
| 4TH  | ○  | ○  |    |    | ○  |    | ○  |    |    |    |
| REV  |    | ○  | ○  |    |    |    | ○  |    |    | ○  |
| (REV)|    |    | ○  |    |    |    |    |    |    | ○  |

OIL PRESSURE CONTROL FOR AUTOMATIC TRANSMISSIONS

BACKGROUND OF THE INVENTION

The present invention relates to an automatic transmission for automobiles and, more particularly, to a system for controlling feed and release of pressure oil to and from a frictional engagement element such as a clutch in the automatic transmission.

An automatic transmission for an automobile is equipped, as well known in the art, with a plurality of multi-disc clutches or brakes, which are engaged by a oil pressure so as to set gear stages by changing the power transmission lines of a gear train. In the multi-disc clutch of those frictional engagement elements, a piston made movable back and forth relative to clutch discs is fitted deep in a clutch drum having the splined clutch discs and is moved forward by feeding the oil pressure to the back thereof. As a result, the piston thrusts the clutch discs into frictional contact with the clutch discs thereby to transmit the torque.

The feed of the oil pressure to such clutch is effected via an oil passage of a shaft or boss which is arranged on the center axis of the clutch, and the release of the pressure is also effected mainly via the oil passage. The clutch is provided for connecting two revolving members and may revolve in an idle state. In this case, the residual oil is subjected to a centrifugal force so that it might be unable to go out via that oil passage. Thus, it is a current practice that the piston of the clutch is equipped with a check ball which is moved by a centrifugal force while the clutch is idly revolving to release the oil pressure from the oil passage, so that an oil release port may be opened to release the oil. The structure of this kind is disclosed, for example, in "Repair Manual of Automatic Transmission (1985-1)" issued by Toyota Motors, Co., Ltd. If, therefore, the check ball functions as expected, any unnecessary centrifugal oil pressure is not built up at the back of the piston so that the clutch can be released, as desired.

The aforementioned oil release port to be opened or closed by the check ball is formed to release the oil so that the centrifugal oil pressure may not be established, and has to be reliably closed by the check ball in case the oil pressure is fed to the back of the piston, i.e., into the cylinder. For this reliability, the oil release port is formed to have a relatively small diameter. The R.P.M. of the clutch may increase to an excessively high value, while the clutch is idly revolving, in dependence upon the depression of the accelerator pedal. In this case, the outflow, if any, of the oil of the oil release port from the cylinder is limited to build up the centrifugal oil pressure by the residual oil. As a result, the clutch has its discs thrust by the piston before most of the oil flows out of the cylinder. Accordingly, the clutch is engaged although slightly to cause the so-called "clutch drag torque". Since, in this state, the clutch discs and the clutch plates seriously slip, they are highly worn. On the other hand, the time lag till the clutch is completely released is elongated to raise another problem that the responsiveness of a shift is deteriorated to harm the shift feel of the driver.

SUMMARY OF THE INVENTION

An object of the present invention is to provide an oil pressure control system which can prevent the clutch drag torque which might otherwise be caused when the clutch idly revolves.

Another object of the present invention is to improve the durability of the clutch.

Still another object of the present invention is to improve the responsiveness of a shift thereby to provide an excellent shift feel.

According to the present invention, there is provided an oil pressure control system for an automatic transmission which is equipped with a clutch including: an oil chamber; a piston adapted to be moved forward by pressure oil fed to the oil chamber; a plurality of friction discs adapted to engage when thrust by the piston; and a check valve assembly adapted to be opened by a centrifugal force, to release the pressure oil from the oil chamber. The control comprises: an oil passage for feeding and releasing the pressure oil to and from the oil chamber; a limiter for limiting the inflow of the pressure oil into the oil chamber via the oil passage; idle revolution detecting means for detecting that the clutch is idly revolving, to output an output signal when it detects the idle revolution; and command means made responsive to the output signal of the detecting means for limiting the inflow of the pressure oil into the clutch via the oil passage. Thus, even if the clutch idly revolves so that a centrifugal force is exerted upon the oil residing in the clutch to move the piston forward, this movement of the piston by the centrifugal oil pressure is suppressed because the inflow of the oil into the oil chamber is limited by the limiter. In short, the clutch is prevented from being engaged by the centrifugal oil pressure.

If, moreover, the control system is equipped with a sensor for detecting the R.P.M. of the clutch, the inflow of the oil is limited by the limiter if the R.P.M. of the clutch exceeds a predetermined value.

If, still moreover, the control system is equipped with a timer, the limit of the inflow of the oil by the limiter can be prevented from unnecessarily lasting even after the oil has been sufficiently discharged from the clutch.

The above and further objects and novel features of the present invention will more fully appear from the following detailed description when the same is read with reference to the accompany drawings. It is to be expressly understood, however, that the drawings are for purpose of illustration only and is not intended as a definition of the limits of the invention.

DETAILED DESCRIPTION OF THE PREFERRED EMBODIMENT

First of all, the basic structure of the present invention will be described with reference to FIG. 1. Specifically, an oil pressure control system of the invention is applied to an automatic transmission 6 which is equipped with a clutch 5. This clutch 5 includes: an oil chamber 1; a piston 2 adapted to be moved forward by pressure oil fed to the oil chamber 1; a plurality of friction discs 3 adapted to engage when thrust by the piston 2; and a check valve assembly 4 adapted to be opened by a centrifugal force, to release the pressure oil from the oil chamber 1. Moreover, this oil pressure control system includes: an oil passage 7 for feeding and releasing the pressure oil to and from the oil chamber 1; a limiter 8 for limiting the inflow of the pressure oil into the oil chamber 1 via the oil passage 7; an idle detector 9 for detecting that the clutch 5 is idly revolving, to output an output signal when it detects the idle revolution; and a command unit 10 made responsive to the output signal of the detector 9 for limiting the inflow of the pressure oil into the clutch 5 via the oil passage 7.

The clutch 5 of the automatic transmission 6 thus constructed has its piston 2 moved forward by feeding the pressure oil to the oil chamber 1 via the oil passage so that it is brought into engaged state by thrusting the friction discs 3 and into released state by evacuating the oil chamber 1. While the clutch 5 is revolving with the oil chamber 1 being evacuated, the check valve assembly 4 is opened by the centrifugal force to release the pressure. In this case, this idle revolution of the clutch 5 is detected by the idle detector 9, and the limiter 8 is operated by the command unit 10 in response to the output signal of the detector 9 so that it limits the inflow of the pressure oil into the oil chamber 1 via the oil passage 7. As a result, the feed of the pressure oil to the oil chamber 1 is limited to suppress the increase in the capacity of the oil chamber 1, i.e., the forward movement of the piston 1, even if promoted by the centrifugal oil pressure. Thus, it is possible to prevent the clutch drag torque which might otherwise be caused by the slight engagement of the friction discs 3.

Figure 2:
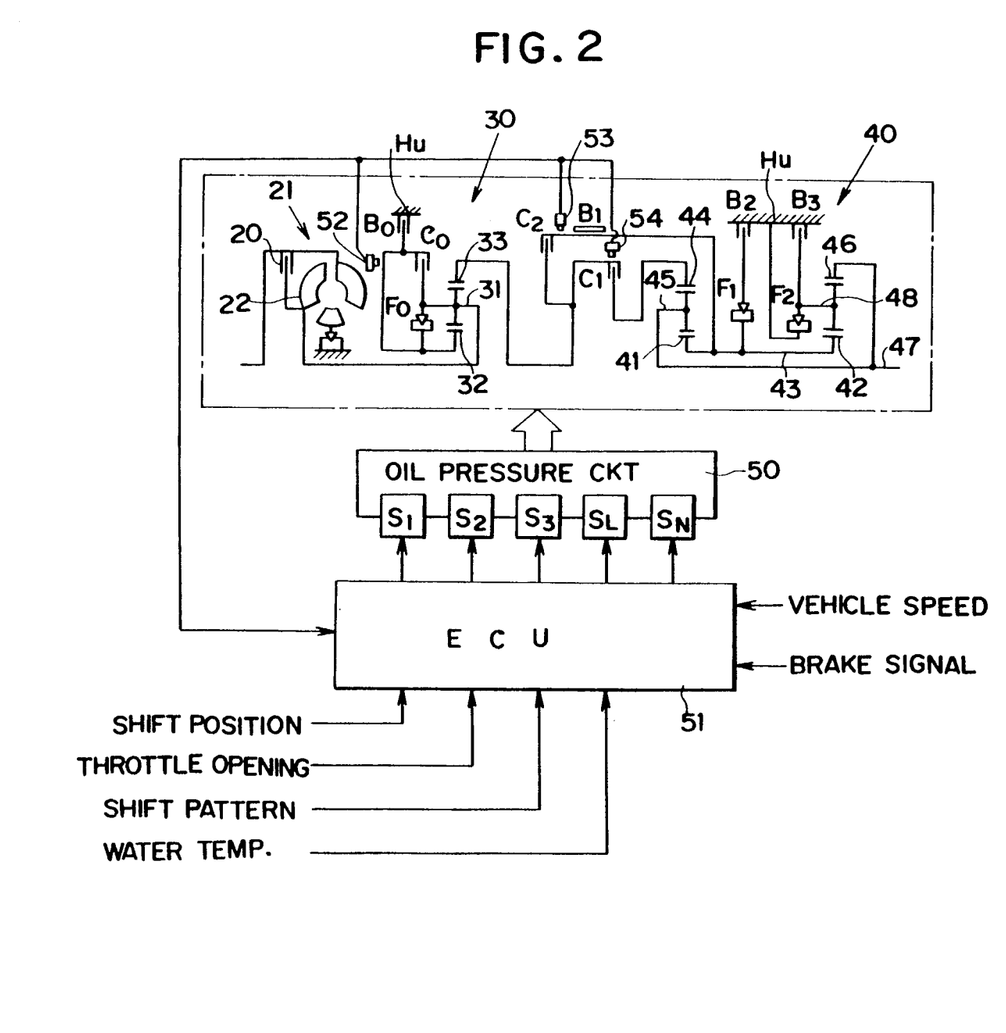
FIG. 2 is a schematic diagram showing one embodiment of the present invention.

FIG. 2 is a schematic diagram showing one embodiment of the present invention. The automatic transmission, as shown herein, is constructed as a shift mechanism to include: a torque converter 21 having a lockup clutch 20; a second transmission unit 30 having a set of planetary gear mechanism; and a first transmission unit 40 having two sets of planetary gear mechanisms for setting a plurality of forward gear stages and one reverse stage.

The second transmission unit 30 shifts two high and low stages, and its planetary gear mechanism has a carrier 31 connected to a turbine runner 22 of the torque converter 21. Between these carrier 31 and a sun gear 32, there are interposed a clutch $C_o$ and a one-way clutch $F_0$, which are arranged in parallel to each other. A brake $B_0$ is interposed between the sun gear 32 and a housing Hu.

The planetary gear mechanisms of the first transmission unit 40 have their individual sun gears 41 and 42 fixed on a common sun gear 43. A first clutch $C_1$ is interposed between a ring gear 44 of the lefthand (or front) side planetary gear mechanism of the first transmission unit 40 and a ring gear 33 of the second transmission unit 30. On the other hand, a second clutch $C_2$ is interposed between the sun gear 43 and the ring gear 33 of the second transmission unit 30. A carrier 45 of the lefthand side planetary gear mechanism and a ring gear 46 of the righthand (or rear) side planetary gear mechanism of the first transmission unit 40 are connected to each other and to an output shaft 47.

Moreover, a first brake $B_1$ acting as a band brake is so disposed around the outer circumference of the clutch drum of the second clutch $C_2$ as to stop the revolution of the sun gear shaft 43. Between the sun gear 43 and the housing Hu, there are interposed a first one-way clutch $F_1$ and a second brake $B_2$, which are arranged in series. Between a carrier 48 of the rear side planetary gear mechanism and the housing Hu, on the other hand, there are interposed a second oneway clutch $F_2$ and a third brake $B_3$, which are arranged in parallel.

Figure 1:
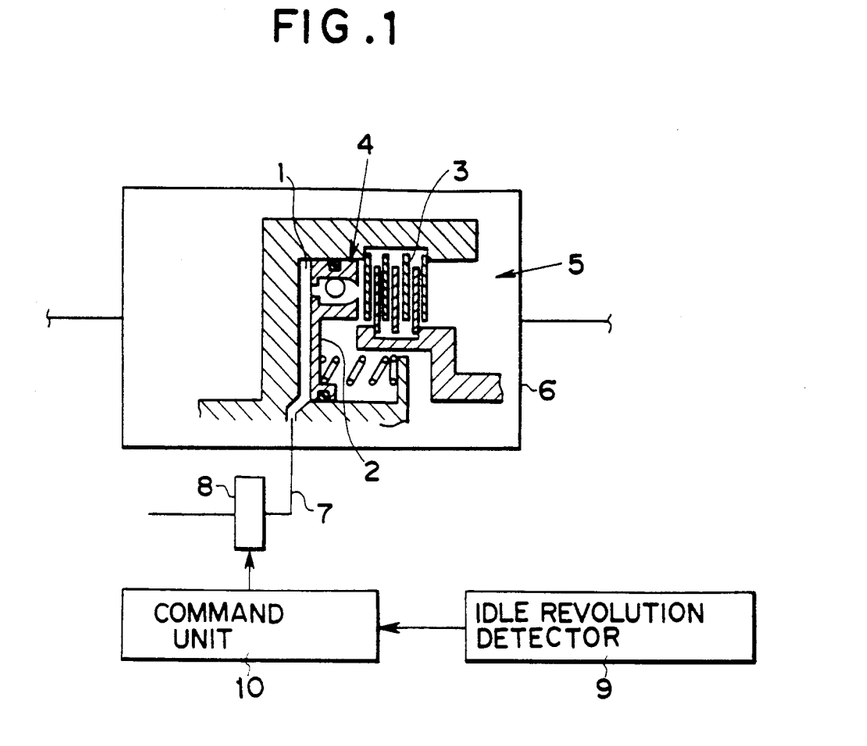
FIG. 1 is a block diagram showing a basic structure of the present invention.

Each of the clutch $C_0$ in the second transmission unit 30 and the first and second clutches $C_1$ and $C_2$ in the first transmission unit 40 thus far described is equipped, like the clutch 5 schematically shown in FIG. 1, with a check valve assembly in which the piston is moved forward by feeding the pressure oil to the oil chamber to engage the friction discs and which is opened by the centrifugal force by releasing the pressure from the oil chamber. There is further provided an oil pressure circuit 50 for feeding and releasing the pressure oil to those clutches $C_0$, $C_1$ and $C_2$ and the aforementioned individual brakes $B_0$, $B_1$, $B_2$ and $B_3$.

This oil pressure circuit 50 is constructed to include: first and second solenoid valves $S_1$ and $S_2$ for executing shifts at the first transmission unit 40; a third solenoid valve $S_3$ for executing the change in the high/low stages in the second transmission unit 30; a lockup solenoid valve $S_L$ for executing the ON/OFF (i.e., engagement/release) of the lockup clutch 20; and a back pressure solenoid valve $S_N$ for controlling the back pressure of a (not-shown) accumulator. In order to control the ON/OFF of those solenoid valves $S_1$ to $S_3$, $S_L$ and $S_N$, there is also provided an electronic control unit (ECU) 51. The electronic control unit 51 is composed mainly of central processing elements, memory elements and input/output interfaces. The electronic control unit 51 is made responsive to data for controlling those solenoid valves $S_1$ to $S_3$, $S_L$ and $S_N$, such as a vehicle speed, a throttle opening, shift positions including the drive (D) range and the neutral (N) range, shift patterns including a power mode and an economy mode, an engine cooling water temperature, and brake signals indicating the operational stages of the foot brake and the side brake. With the electronic control unit 51 thus constructed, there are connected clutch R.P.M. sensors 52, 53 and 54 for detecting the R.P.M. of the aforementioned individual clutches $C_0$, $C_1$ and $C_2$, i.e., especially the R.P.M. of their clutch drums.

Figure 3:
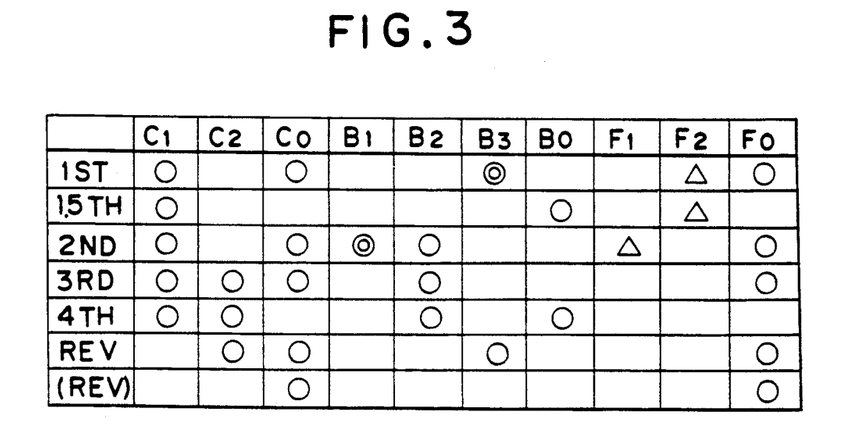
FIG. 3 is a clutch and brake application chart showing the automatic transmission shown in FIG. 2.

In the automatic transmission, as shown, the individual frictional engagement elements are engaged to set the individual gear stages, as tabulated in the clutch and brake application chart of FIG. 3. In FIG. 3: symbols ○ indicate that the elements are in the engaged states; symbols ⊙ indicate that the elements are engaged at an engine brake time; blanks indicate that the elements are in the released states; and symbols Δ indicate that the elements are released at a coasting time.

As shown in FIG. 3, the first clutch $C_1$ is released at the reverse stage to revolve backward (i.e., in the direction opposite to that of the engine), and the second clutch $C_2$ is released at the 1st and 2nd speeds and revolves backward at the 1st and 1.5th speeds. In these clutches $C_1$ and $C_2$, therefore, the influences of the centrifugal oil pressure may not be felt in some shifts, and the aforementioned oil pressure circuit 50 has an oil circuit structure assembled therein, as shown in FIG. 4.

Figure 4:
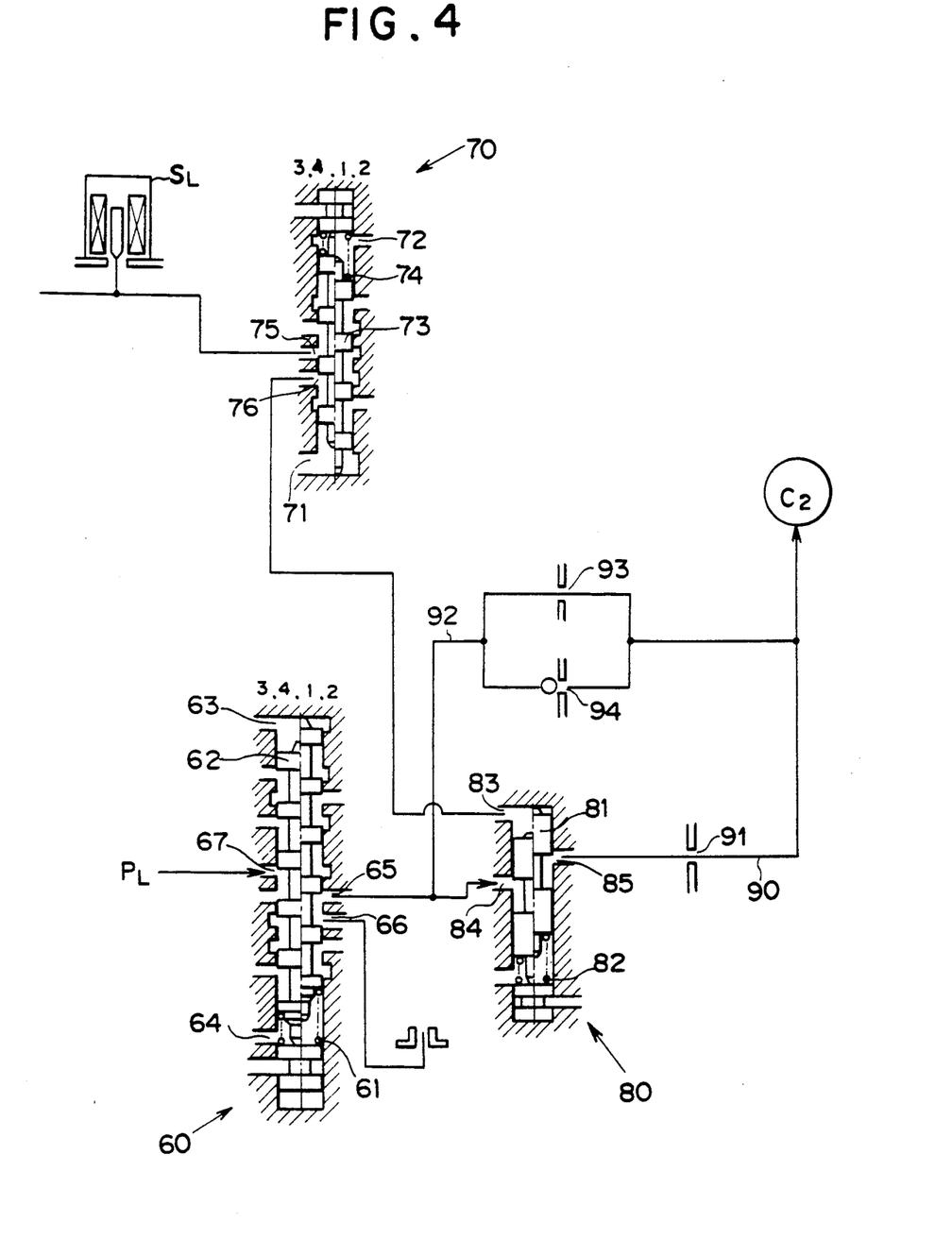
FIG. 4 is an oil pressure circuit diagram showing one example of an oil passage structure including a limiter.

The example shown in FIG. 4 exemplifies the second clutch $C_2$. Between a 2-3 shift valve 60 (switching means) and the second clutch $C_2$, there is interposed an orifice change-over valve 80 which is actuated by the control pressure oil fed or released through a solenoid relay valve 70. In the 2-3 shift valve 60, a spool 61 biased in one direction (e.g., upward of FIG. 4) by a spring 61 is switched by feeding or releasing the pressure oil to or from a control port 63 or a hold port 64. At the 1st or 2nd speed, the spool 62 is pushed up, as shown at the righthand half of FIG. 4, to allow a clutch port 65 to communicate with a drain port 66. At the 3rd and 4th speeds, the spool 62 is pushed down, as shown at the lefthand half of FIG. 4, to allow the clutch port 65 to communicate with a port 67 which is fed with a line pressure $P_L$. The solenoid relay valve 70 is also a spool valve. At the 1st or 2nd speed, the pressure oil is released from a control port 71 or fed to a hold port 72 so that a spool 73 is pushed down to the position, as indicated at the righthand half of FIG. 4, by a spring 74. As a result, a port 75 connected with the lockup solenoid valve $S_L$ is caused to communicate with a port 76 adjacent thereto. At the 3rd and 4th speeds, on the other hand, the pressure oil acts upon the control port 71 so that the spool 73 is pushed up the position indicated at the lefthand half of FIG. 4 to block the communication between the aforementioned ports 75 and 76. Moreover, the orifice change-over valve 80 is switched between the ON state, in which an input port 84 and an output port 85 communicate, and the OFF state, in which the communication between the input port 84 and the output port 85 is blocked, by feeding the pressure oil to a control port 83 against a spring 82 urging a spool 81 or by releasing the pressure oil from the control port 83. The orifice change-over valve 80 thus constructed has its input port 84 connected to the clutch port 65 of the 2-3 shift valve 60 and its control port 83 connected to the port 76 of the solenoid relay valve 70. The output port 85 of the orifice change-over valve 80 is connected to the second clutch $C_2$. An oil passage 90 leading from the output port 85 to the second clutch $C_2$ is equipped with a first orifice 91. There is further provided another oil passage 92 for bypassing those orifice change-over valve 80 and first orifice 91. The oil passage 92 is equipped therein with a second orifice 93 and a check ball valve 94, which are arranged in parallel to each other.

Figure 5:
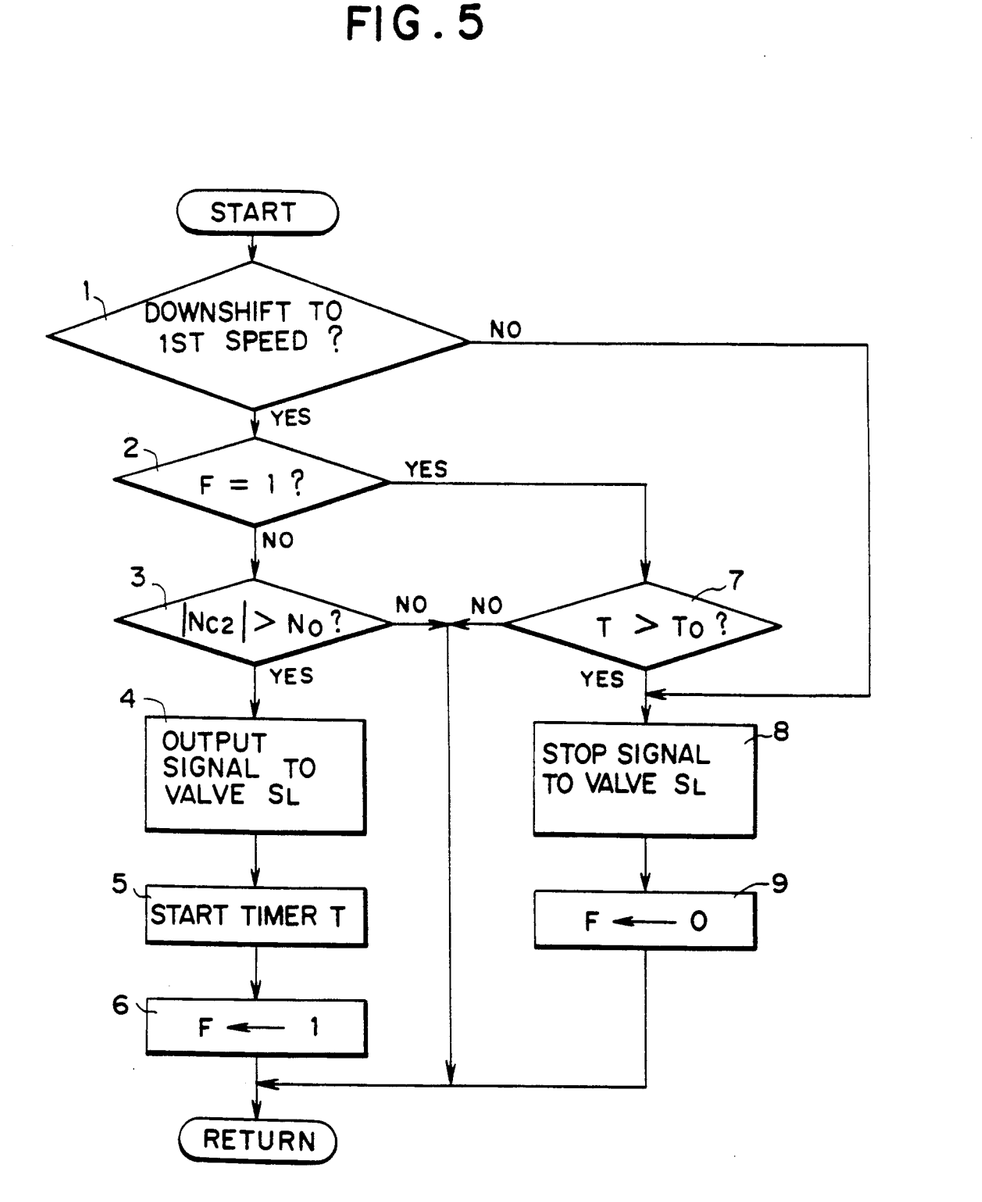
FIG. 5 is a flow chart showing a control routine.

The operations of the system thus constructed will be described in the following. The aforementioned orifice change-over valve 80 acts as the limiter for the second clutch $C_2$ and limits the inflow of the oil pressure into the second clutch $C_2$ when this clutch $C_2$ idly revolves. With reference to FIG. 5 showing the flow chart of the control routine, it is decided at Step 1 whether or not a command for a downshift to the 1st speed has been outputted. This decision is performed partly because the second clutch $C_2$ idly revolves at the 1st speed and partly because the oil having been fed at another speed resides at the 1st speed to build up the centrifugal oil pressure. Moreover, this decision is accomplished by the electronic control unit 51 in terms of the changes in the vehicle speed and the throttle opening and the output of the ON signal to any of the solenoid valves $S_1$ to $S_3$. If the answer is "YES", the routine advances to Step 2, at which it is decided whether or not a flag F indicating that the timer is counting is at "1". If this answer is "NO", the routine advances to Step 3, at which it is decided whether or not the R.P.M. $N_{c2}$ of the second clutch $C_2$ exceeds a predetermined reference value $N_0$. This decision is performed to avoid unnecessary control because the influences of the centrifugal oil pressure raise no problem if the second clutch $C_2$ idly revolves at a small R.P.M. even with the residual oil. This decision is performed by comparing the R.P.M. of the second clutch $C_2$, which is detected by the clutch R.P.M. sensor 54, with the reference value $N_0$ which is stored in advance in the electronic control unit 51. Hence, the control process is returned if the answer of Step 3 is "NO", and the signal is outputted to the lockup solenoid valve $S_L$ to apply the oil pressure to the port 75 of the solenoid relay valve 70 if the answer is "YES". Here, if the lockup solenoid valve $S_L$ is a linear solenoid valve, a current value, for example, is increased to boost the oil pressure to be applied to the port 75. If, on the other hand, the lockup solenoid valve $S_L$ is an ON/OFF valve, the release port is closed to apply the line pressure $P_L$, for example, to the port 75 of the solenoid relay valve 70. At this time, the 2-3 shift valve 60 has its spool 62 lifted, as shown at the righthand half of FIG. 4, by the spring 61 so that the its clutch port 65 communicates with the drain port 66 to release the pressure from the second clutch $C_2$. On the other hand, the solenoid relay valve 70 has its spool 73 positioned at the righthand half of FIG. 4 to provide the communication between the ports 75 and 76. As a result, the oil pressure built up by operating the lockup solenoid valve $S_L$ is applied to the control port 83 of the orifice change-over valve 80 through those ports 75 and 76 so that the spool 81 is pushed down to the position to compress the spring 82, as shown at the lefthand side of FIG. 4. As a result, the communication between the input port 84 and the output port 85 of the orifice change-over valve 80 is blocked so that the oil passage for feeding and releasing the pressure oil to the second clutch $C_2$ is limited only to the oil passage 92 for bypassing the orifice change-over valve 80.

As a result, the forward movement of the piston is suppressed, because there is established no inflow of the oil matching the increase in the capacity of the oil chamber according to the movement of the piston even if the second clutch $C_2$ revolves at an R.P.M. sufficient for building up the centrifugal oil pressure in the oil residing in the oil chamber. In other words, the following equation holds:

$$Q2 = Q1 + x \cdot A,$$

wherein: the amount of oil to be discharged from the check valve assembly such as the check ball of the second clutch $C_2$ is designated at Q1; the amount of oil to pass through the orifice of the oil passage leading to the second clutch $C_2$ is designated Q2; the piston stroke by the centrifugal oil pressure is designated at x; and the pressure receiving area of the piston is designated at A.

If the R.P.M. of the second clutch $C_2$ is kept constant, the oil amount Q1 takes a constant value, and the pressure receiving area A also takes a constant value. If the amount Q2 of the oil to pass through the orifice is reduced, the piston stroke x decreases. Here, that oil amount Q2 is proportional to the square of the orifice diameter. In the aforementioned embodiment, therefore, the orifice diameters are reduced substantially to one half if the first and second orifices 91 and 93 have an equal diameter, so that the amount Q2 of the oil to be fed to or released from the second clutch $C_2$ is reduced to one half. As a result, it is possible to effectively prevent the movement of the piston by the centrifugal oil pressure, namely, the engagement of the second clutch $C_2$ and accordingly the occurrence of the clutch drag torque.

Subsequent to the control at Step 4, a timer T is started at Step 5, and a flag F indicating the start of the counting by the timer T is set to "1" at Step 6.

In these procedures of the routine, therefore, the answer of Step 2 is "YES". Then, the routine advances to Step 7, at which it is decided whether or not the count value of the timer T exceeds a reference value $T_0$. Here will be described the reason for using the timer T. Since the second clutch $C_2$ is equipped with the check valve assembly such as the check ball which is opened for releasing the pressure when in the idle revolution, most of the oil is released from the oil chamber if the idle revolution continues for a predetermined time period, so that the centrifugal oil pressure is not built up. Therefore, the control of limiting the inflow by the orifice change-over valve 80 is executed after the downshift to the 1st speed and before the oil is sufficiently released from the second clutch $C_2$. After this, the inflow limiting control by the orifice change-over valve 80 is not carried out because the influences of the centrifugal oil pressure need not be taken into consideration.

Thus, if the answer of Step 7 is "NO", the control process is returned to continue the output of the command signal to the lockup solenoid valve $S_L$. If the answer is "YES", on the contrary, the control process advances to Step 8, at which the output of the command signal to the lockup solenoid valve $S_L$ is ended. At Step 9, the flag F is reset to zero.

Incidentally, if the answer of Step 1 is "NO", namely, if the shift command signal for the downshift to the 1st speed is not outputted, the control process advances to Step 8.

Figure 6:
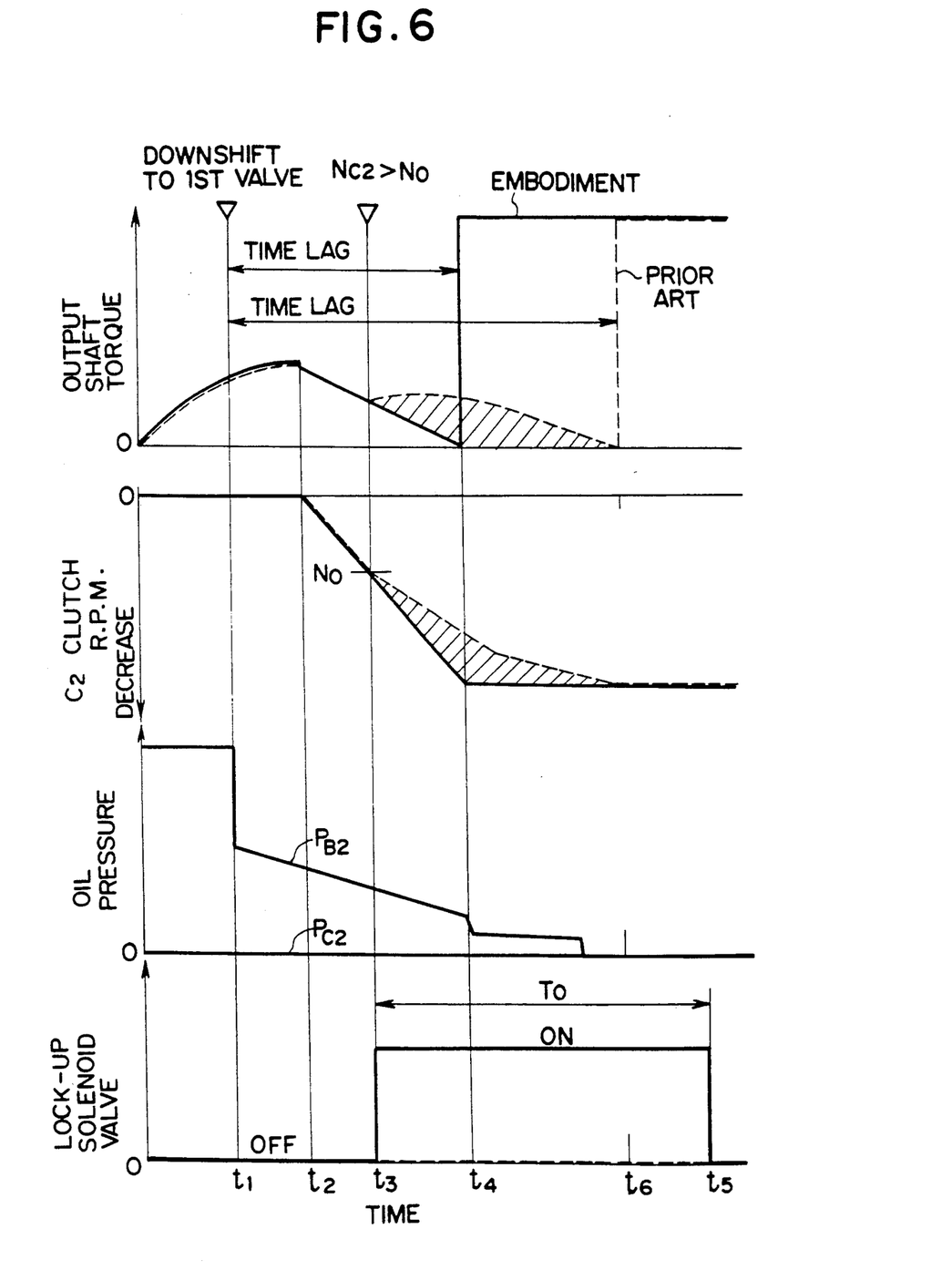
FIG. 6 is a time chart plotting the changes in an output shaft torque, a second clutch R.P.M., a second clutch oil pressure, a second brake oil pressure, and the ON/OFF changes of a lockup solenoid valve.

Not only the individual changes in the output torque, the R.P.M. of the second clutch $C_2$ and the oil pressures $P_{C2}$ and $P_{B2}$ of the second clutch $C_2$ and the second brake $B_2$ but also the ON/OFF of the lockup solenoid valve $S_L$ in case of the aforementioned control are plotted in FIG. 6 in comparison with those of an example of the prior art. If the command signal for the downshift to the 1st speed is outputted at time $t_1$, as shown in FIG. 6, the oil pressure $P_{B2}$ of the second brake $B_2$ begins to drop. At time $t_2$ when the oil pressure $P_{B2}$ drops to some extent, the second clutch $C_2$ begins to revolve backward, and the output shaft torque begins to drop. At time $t_3$ when the R.P.M. $N_{C2}$ of the second clutch $C_2$ exceeds the reference value $N_0$, the signal is outputted to the lockup solenoid valve $S_L$ to limit that inflow of the oil into the second clutch $C_2$, which might otherwise be caused by the centrifugal oil pressure. As a result, the R.P.M. of the second clutch $C_2$ continuously increases, but the output shaft torque continuously decreases. When the second brake $B_2$ loses most of the torque capacity so that the second one-way clutch $F_2$ engages (at time $t_4$), the downshift to the 1st speed is completed to increase the output shaft torque, and the second clutch $C_2$ reaches a predetermined R.P.M. When the set time $T_0$ is elapsed (at time $t_5$) after the end of the downshift to the 1st speed, the output to the lockup solenoid valve $S_L$ is stopped. According to the system thus far described, therefore, the shifting time lag can be shortened to prevent the occurrence of the clutch drag torque.

On the contrary, in case the inflow of the oil into the second clutch $C_2$ by the centrifugal oil pressure is not limited as in the prior art, the second clutch $C_2$ is slightly engaged by the centrifugal oil pressure so that its increase in the R.P.M. of the backward run is midway slowed down to drastically delay the time, at which the R.P.M. of the second clutch $C_2$ reaches the specified one according to the gear ratio, i.e., the ending time $t_6$ of the shift to the 1st speed. In this meanwhile, moreover, the clutch drag torque will be established in the second clutch $C_2$, as hatched in FIG. 6. Thus, the system of the prior art is accompanied not only by an elongated time lag for the shifting operation but also by the serious wear of the clutch.

Incidentally, the embodiment thus far described is exemplified by the control of the second clutch $C_2$, but the present invention should not be restricted to the foregoing embodiment but can be likewise applied to another clutch. Moreover, the limiter for limiting the inflow of the oil into the clutch due to the centrifugal oil pressure should not be restricted to the orifice change-over valve of the embodiment but can employ a cut-off valve or the like, if necessary. Still moreover, the present invention should not have its application restricted to the automatic transmission which is equipped with the gear train shown in FIG. 2.

The advantages to be obtained from the present invention will be described in its entirety. According to the oil pressure control system of the present invention, the clutch can be prevented or suppressed from being engaged by the centrifugal oil pressure, even if it idly runs, so that its durability can be improved by preventing the clutch drag torque and the accompanying wear. Because of no clutch drag torque, moreover, the delay of the shifting operation can be prevented to give the driver an excellent shifting feel.

What is claimed is:

1. An oil pressure control system for an automatic transmission equipped with a clutch including: an oil chamber; a piston adapted to be moved forward by pressure oil fed to said oil chamber; a plurality of friction discs adapted to engage when thrust by said piston; and a check valve assembly adapted to be opened by centrifugal force to release the pressure oil from said oil chamber comprising:

switching means connected to said oil chamber by an oil passage for feeding the pressure oil from said switching means to said oil chamber and for releasing the oil pressure from said oil chamber to said switching means, thereby permitting the clutch to idly revolve;

a limiter for limiting the inflow of the pressure oil into said oil chamber via said oil passage;

idle revolution detecting means for detecting that said clutch is idly revolving, to output an output signal when it detects the idle revolution; and command means responsive to the output signal of said detecting means for controlling said limiter to limit inflow of the pressure oil into said clutch via said oil passage.

2. An oil pressure control system for an automatic transmission according to claim 1, further comprising a revolution speed sensor for detecting revolution speed of said clutch, wherein said command means causes said limiter to limit the inflow of the pressure oil into said clutch if the revolution speed of said clutch exceeds a predetermined value.

3. An oil pressure control system for an automatic transmission according to claim 1, further comprising: timer means for detecting a time period for which the inflow of the pressure oil into said clutch is limited by said limiter, wherein the limit of the inflow of the pressure oil by said limiter is released if the time period detected by said timer means exceeds a predetermined value.

4. An oil pressure control system for an automatic transmission according to claim 1, wherein said check valve assembly includes: an oil release port formed in said piston; and a check ball for closing said oil release port, if the pressure in said oil chamber is high, and opening said oil release port if the pressure in said oil chamber is low and if the centrifugal force is applied.

5. An oil pressure control system for an automatic transmission according to claim 1, wherein said limiter includes: a plurality of orifices formed in parallel midway of said oil passage; and a valve for selectively stopping the flow of the pressure oil through any of said orifices.

6. An oil pressure control system for an automatic transmission according to claim 1, wherein said idle revolution detecting means includes means for detecting the signal to said command means when it detects a gear stage at which said clutch is idly revolving.

7. An oil pressure control method for an automatic transmission equipped with a clutch including: an oil chamber; a piston adapted to be moved forward by pressure oil fed to said oil chamber; a plurality of friction discs adapted to engage when thrust by said piston; and a check valve assembly adapted to be opened by centrifugal force to release the pressure oil form said oil chamber, the automatic transmission also being equipped with switching means for releasing the pressure oil from said oil chamber to said switching means, comprising:

a first step of operating the switching means to release the oil pressure, whereby said clutch can idly revolve;

a second step of detecting that said clutch is idly revolving; and a third step of limiting an inflow of the pressure oil into said clutch in response to the detection of the idle revolution of said clutch.

8. An oil pressure control method for an automatic transmission according to claim 7, wherein said third step limits the inflow of the pressure oil into said clutch if an R.P.M. of said clutch exceeds a predetermined value.

9. An oil pressure control method for an automatic transmission according to claim 7, wherein said third step releases the limit of the inflow of the pressure oil into said clutch if a time period for which the inflow of the pressure oil into said clutch exceeds a predetermined value.

10. An oil pressure control system for an automatic transmission equipped with a clutch including: an oil chamber; a piston adapted to be moved forward by pressure oil fed to said oil chamber; a plurality of friction discs adapted to engage when thrust by said piston; and a check valve assembly adapted to be opened by centrifugal force to release the pressure oil from said oil chamber, comprising:

an oil passage for feeding and releasing the pressure oil to and from said oil chamber;

a limiter for limiting the inflow of the pressure oil into said oil chamber via said oil passage;

idle revolution detecting means for detecting that said clutch is idly revolving, to output an output signal when it detects the idle revolution;

command means responsive to the output signal of said detecting means for limiting the inflow of the pressure oil into said clutch via said oil passage; and an R.P.M. sensor for detecting R.P.M. of said clutch, wherein said command means causes said limiter to limit the inflow of the pressure oil into said clutch if the R.P.M. of said clutch exceeds a predetermined value.

11. An oil pressure control system for an automatic transmission equipped with a clutch including: an oil chamber; a piston adapted to be moved forward by pressure oil fed to said oil chamber; a plurality of friction discs adapted to engage when thrust by said piston; and a check valve assembly adapted to be opened by centrifugal force to release the pressure oil from said oil chamber, comprising:

an oil passage for feeding and releasing the pressure oil to and from said oil chamber;

a limiter for limiting the inflow of the pressure oil into said oil chamber via said oil passage;

idle revolution detecting means for detecting that said clutch is idly revolving, to output an output signal when it detects the idle revolution;

command means responsive to the output signal of said detecting means for limiting the inflow of the pressure oil into said clutch via said oil passage; and timer means for detecting a time period for which the inflow of the pressure oil into said clutch is limited by said limiter, wherein the limit of the inflow of the pressure oil by said limiter is released if the time period detected by said timer means exceeds a predetermined value.

12. An oil pressure method for an automatic transmission equipped with a clutch including: an oil chamber; a piston adapted to be moved forward by pressure oil fed to said oil chamber; a plurality of friction discs adapted to engage when thrust by said piston; and a check valve assembly adapted to be opened by centrifugal force to release the pressure oil from said oil chamber, comprising:

a first step of detecting that said clutch is idly revolving; and a second step of limiting the inflow of the pressure oil into said clutch when the idle revolution of said clutch is detected, wherein said second step limits the inflow of the pressure oil into said clutch if an R.P.M. of said clutch exceeds a predetermined value.

13. An oil pressure method for an automatic transmission equipped with a clutch including: an oil chamber; a piston adapted to be moved forward by pressure oil fed to said oil chamber; a plurality of friction discs adapted to engage when thrust by said piston; and a check valve assembly adapted to be opened by centrifugal force to release the pressure oil from said oil chamber, comprising:

a first step of detecting that said clutch is idly revolving; and a second step of limiting the inflow of the pressure oil into said clutch when the idle revolution of said clutch is detected, wherein said second step releases the limit of the inflow of the pressure oil into said clutch if a time period for which the inflow the pressure oil into said clutch exceeds a predetermined value.

* * * * *